Jan. 3, 1956   R. R. AMESBURY   2,729,412
FASTENING DEVICE
Filed Nov. 5, 1952
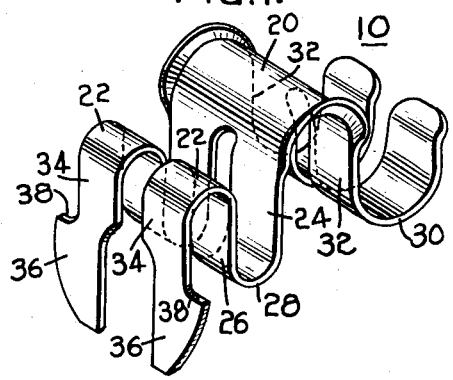
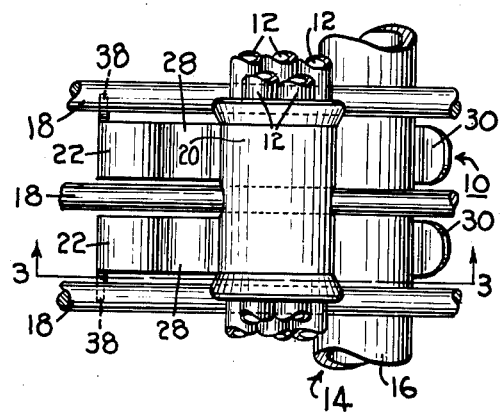
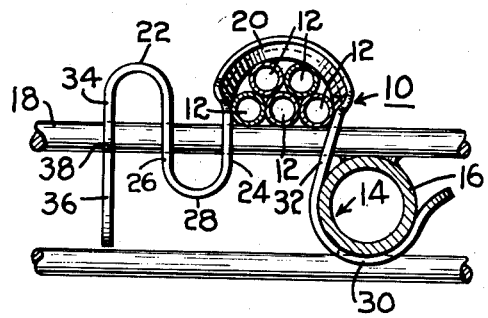
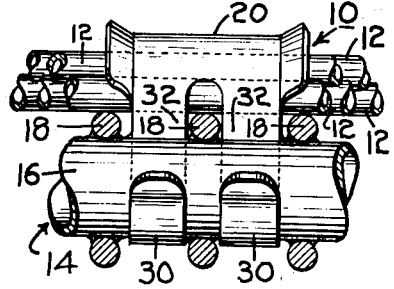
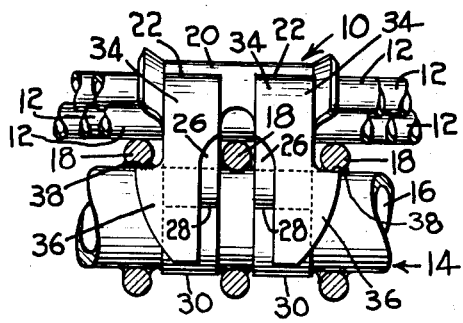
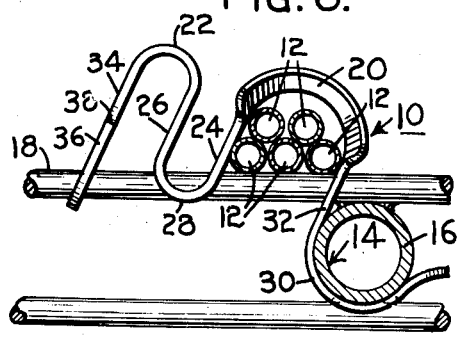
INVENTOR:
ROBERT R. AMESBURY,
BY *Robert E Ross*
ATTORNEY.

United States Patent Office 2,729,412
Patented Jan. 3, 1956

2,729,412

FASTENING DEVICE

Robert R. Amesbury, Wellesley, Mass., assignor, by mesne assignments, to United-Carr Fastener Corporation, Boston, Mass., a corporation of Delaware Application November 5, 1952, Serial No. 318,893

4 Claims. (Cl. 248—68)

This invention relates generally to fastening devices and has particular reference to a fastener adapted to attach a tube, wire or other elongated member to a support.

The object of the invention is to provide an improved fastener for snap fastener engagement with a support to securely retain a tube or the like on the support.

A still further object of the invention is to provide a fastener for attaching a tube or the like to a support which consists of a longitudinal member with a series of spaced transverse rod-like members attached thereto.

A still further object of the invention is to provide a fastener for attaching a tube or the like to a support which has a snap fastener portion, for engagement with the support, which is both vertically and transversely resilient.

Other objects of the invention will, in part, be obvious, and will, in part, appear hereinafter.

In the drawing:

Fig. 1 is a perspective view of a fastening device embodying the features of the invention.

Fig. 2 is a top plan view of the fastener of Fig. 1 attached to a support.

Fig. 3 is a view in section taken on line 3—3 of Fig. 2.

Fig. 4 is a view of the fastener assembly of Fig. 3 as seen from the right end.

Fig. 5 is a view of the fastener assembly of Fig. 3 as seen from the left end.

Fig. 6 is a view in side elevation illustrating the method of attaching the fastener to the support.

Referring to the drawing, there is illustrated a fastener 10, which is adapted for attaching a number of tubular members 12 or the like to a support 14.

The support 14, in the illustrated embodiment, is a portion of a refrigerator condenser assembly, and comprises a longitudinally extending tubular member 16, with spaced transversely extending members 18 attached thereto. The members 12 may be capillary tubes, wires or the like which extend across the transverse members, to be securely attached to the support.

The fastener 10 is preferably formed of an elongated piece of sheet metal and comprises generally a first upwardly rounded portion 20 which is generally U-shaped and a second upwardly rounded and generally U-shaped portion 22 spaced therefrom. Adjacent arms 24 and 26 of the U-shaped portions 20 and 22 respectively are joined by a connecting portion 28.

To provide means at one end of the fastener for engagement with the support, an upwardly rounded hook member 30 is provided extending outwardly from the unconnected arm 32 of the U-shaped portion.

To provide means at the other end of the fastener for snapping engagement with the support, the unconnected arm 34 is extended downwardly and is longitudinally bifurcated to form a pair of arm portions 36 having snap shoulders 38 disposed on the outer edges thereof. The upwardly rounded portion 22 imparts vertical resilience to the arm portions 36, and the bifurcation imparts transverse resilience thereto, so that the arm portions are flexible both up and down and laterally toward and away from each other.

To assemble the tubular members 12 onto the support, the tubular members are disposed across the transverse members 18 in suitable spaced relation to the longitudinal member 16. The hook member 30 is then inserted between a pair of transverse members under the longitudinal member, and the other end of the fastener is moved downwardly toward the support so that the U-shaped portion 20 encloses the tubular members 12, as is best illustrated in Fig. 6. Said other end of the fastener is then pushed downwardly until the arm portions 34 pass between two transverse members by flexing toward each other and snap into engagement therewith. (See Fig. 5.) The tubular members 12 are thereby securely retained on the support.

In the illustrated embodiment, the spacing of the transverse members is such that the fastener straddles one transverse member and engages the transverse members on either side thereof. For this reason the bifurcation of the arm portions 34 extends beyond the U-shaped portion 22 and into the arm 24 of the U-shaped portion 20, and the hook member 30 is also bifurcated, with the bifurcation therein extending into the arm 32 of the U-shaped portion. However, it will be understood that in other modifications, in which the fastener is to be assembled onto a support having wider spacing between the transverse members, or in which the fastener is to be assembled into an elongated slot, bifurcation is desirable only in the end of the fastener which is to snap into engagement with the panel.

Since certain other obvious modifications may be made in the device without departing from the scope of the invention, it is intended that all matter contained herein be interpreted in an illustrative and not in a limiting sense.

I claim:

1. A clip for attaching tubing or the like to a support, comprising a pair of spaced upwardly rounded portions which are connected at adjacent ends, hook means extending laterally from the unconnected end of one upwardly rounded portion for engagement with the support, and other means extending downwardly from the unconnected end of the other upwardly rounded portion for snapping engagement with the support, said other means being longitudinally bifurcated so as to be transversely resilient, and having snap shoulder means on the edges for snapping engagement with the support.

2. A clip for attaching tubing or the like to a support, comprising a pair of spaced upwardly extending U-shaped portions, the adjacent arms of said U-shaped portions being joined at the ends, the outermost arm of one of the U-shaped portions being longitudinally bifurcated and having snap shoulder means disposed thereon for snapping engagement with portions of the support, the outermost end of the other U-shaped portion having laterally extending means for hooking under a portion of the support.

3. A clip for attaching tubing or the like to a support, comprising a pair of spaced upwardly extending U-shaped portions joined at the ends of adjacent arms, upwardly curved hook means extending laterally from the outermost arm of one U-shaped portion, and a downwardly extending support engaging member extending from the outermost arm of the other U-shaped portion, said downwardly extending member and said other U-shaped portion being longitudinally bifurcated to impart transverse resilience thereto, and snap shoulders disposed on the outer edges of said downwardly extending member.

4. A fastener assembly, comprising a support having a longitudinally extending member and a series of spaced transversely extending members, a tubular member extending across the transverse members, and a fastener clip retaining the tubular member on the support, said fastener clip comprising a first upwardly extending U-shaped portion extending over the tubular member and retaining it against the transverse members, a second upwardly extending U-shaped portion spaced from the first, the adjacent arms of said U-shaped portions being joined below the transverse members, an upwardly rounded hook member extending from the unconnected arm of the first U-shaped portion under the longitudinal member in hooking engagement therewith, and a downwardly extending member extending from the unconnected arm of the other U-shaped portion, said downwardly extending member being bifurcated to impart transverse resilience thereto, and having snap shoulders disposed on the outer edges in snapping engagement with a pair of said transverse members.

References Cited in the file of this patent

UNITED STATES PATENTS

| | | |
|---|---|---|
| 2,414,986 | Tinnerman | Jan. 28, 1947 |
| 2,454,894 | Tatom | Nov. 30, 1948 |
| 2,467,604 | Tinnerman | Apr. 19, 1949 |
| 2,485,891 | Kindorf | Oct. 25, 1949 |